US000001330H

United States Statutory Invention Registration [19]

[11] Reg. Number: H1330

Williams

[43] Published: Jul. 5, 1994

[54] METHOD OF MEASURING STRUCTURAL INTENSITIES IN VIBRATING PLATE RADIATORS

[76] Inventor: Earl G. Williams, 4507 Twinbrooke St., Fairfax, Va. 22032

[21] Appl. No.: 767,188

[22] Filed: Sep. 30, 1991

[51] Int. Cl.[5] ..... G03H 3/00
[52] U.S. Cl. ..... 367/8; 367/13
[58] Field of Search ..... 367/8, 11, 13

[56] References Cited

PUBLICATIONS

Williams et al., A Technique For Measurement Of Structure-Borne Intensity In Plates, Wash. D.C., 1985 Acoustical Society of America, 2061-2068.

*Primary Examiner*—Brian S. Steinberger

[57] ABSTRACT

Structure-borne intensities in a vibrating plate radiator having at least one source of vibration are measured without contacting the radiator by producing a pressure hologram of the pressure radiated from the surface of the radiator, determining the normal velocity of the radiator surface from the pressure hologram, and determining at least one component of the structure-borne intensity from the normal velocity.

2 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MEASURING STRUCTURAL INTENSITIES IN VIBRATING PLATE RADIATORS

FIELD OF THE INVENTION

This invention relates generally to measurement of structure-borne intensities in vibrating plane radiators or sources, and in particular to non-contact measurement of structure-borne intensities in vibrating plate acoustic sources.

BACKGROUND OF THE INVENTION

There has been increasing interest in the measurement, using an acoustic intensity probe, of sound fields radiated into a medium from various acoustic sources. As a consequence, there has also been increased interest in measuring structure-borne intensities (power flows) within the sources.

Several papers have been published which discuss the measurement of structural intensities in thin plates. See Pavic, *Proceedings of the International Conference on Recent Developments in Acoustic Intensity Measurement,* ed. by M. Crocker, et al. (CETIM, Senis, France 1981), pp. 209–215; Pinnington, et al., ibid., pp. 229–236; Pavic, "Measurement of structure borne wave intensity, part I: Formulation of the methods," *J. Sound Vib.,* Vol. 49, pp. 221–230 (1976); Noiseux, "Measurement of power flow in uniform beams and plates," *J. Acoustic Soc. Am.,* Vol. 47, pp. 238–247 (1970); and Rasmussen, "Measurement of plate waves," *J. Acoustic Soc. Am.,* Vol. 75 (S1), S1(A) (1984). The Noiseux measurement method uses a biaxial accelerometer for measuring intensity in a plate. The Rasmussen method uses two closely spaced accelerometers.

The use of contact accelerometers to measure structural intensity has a number of disadvantages. First, the accelerometers are sensitive to motions in directions perpendicular to the desired measurement direction. This is especially a problem when the accelerometers are used in a biaxial or triaxial configuration. In addition, the weight and rotational inertia of the accelerometers can interfere with the vibration of the plate, and thus with calculation of the intensity measurements. Further, the amplitude and phase responses of the accelerometers must be very closely matched in order to ensure accurate measurements. In some cases, phase matching of 0.1 degrees is required.

A number of measurement methods have been used which provide diverse information about the radiation of sound waves from a source. These are generally concerned with providing one of the following characteristics of the sound field: farfield directivity, nearfield vector intensity, surface velocity (as for a vibrating plate), and total sound power. To measure the farfield directivity, a microphone in the farfield is passed around a sound source in an anechoic chamber to determine the variation of the sound pressure with respect to the angle between the microphone and the sound source. These measurements are used in underwater source calibrations, in loudspeaker and musical instrument studies, and the like. A disadvantage of farfield directivity measurements is that large or low frequency sources require the microphone to be placed a considerable distance away from the source to get an accurate measurement, which may be beyond the size of any available anechoic chamber. There are other techniques which use measurements in the near field on cylindrical and spherical surfaces to calculate the far field directivity. For these measurements, a small anechoic chamber is sufficient, but an anechoic chamber is still required.

Measurement of the nearfield vector intensity has received a great deal of attention in acoustics. U.S. Pat. No. 3,364,461 to W. J. Trott discloses a large planar array of transducers wherein the sensitivities of the individual elements (transducers) are shaded to produce a constant, planar wave in the nearfield extending over the aperture of the array. The shading is such that the sensitivity of the elements increases from the extremities toward the center of the array according to the coefficients of a summed binomial probability distribution function. While this system provides nearfield measurements over a large aperture, and the simultaneous outputs of the elements are integrated to provide some useful response and directivity characteristics of a sound source, it has the disadvantage of relatively fixed shading values, and lacks the ability to resolve the individual radiating features of a complex source.

In another technique, two closely spaced microphones are moved in an imaginary surface enclosing a sound source to measure both the sound pressure and its gradient. From such measurements, one component of the vector intensity may be calculated. By scanning over a surface, the average radiant sound power can be determined. This technique is limited, though, because coherent measurement can be made only in a small area, and the results do not reveal the complicated nature of the intensity vector field in the vicinity of the source, nor the transition region between the source and the farfield. There is further error due to the finite separation of the microphones. Another common intensity measurement technique is similar to the two microphone technique, but uses an accelerometer mounted to the source in place of the second microphone. The accelerometer determines the component of the pressure gradient normal to the surface, and hence only determines the normal component of the intensity. The single microphone/accelerometer technique suffers from the same disadvantages as the two microphone technique, and is also time consuming for larger, more complicated sources. The surface velocity, or modal pattern, is usually determined by mapping the surface with an accelerometer, but like the two microphone intensity measurement technique, this has a disadvantage of being time consuming. A known non-contact method of determining the surface velocity involves optical holography. This technique, however, requires highly specialized equipment and controlled laboratory conditions, and cannot be used to study large areas.

The present inventor is also the coinventor of a non-wavelength-limited method of holographic reconstruction of sound fields to provide visual representations of acoustical characteristics of sound waves, which method is disclosed in U.S. Pat. No. 4,415,996 to Maynard et al. and assigned to the assignee of the present invention.

SUMMARY OF THE INVENTION

It is an object of the present invention to provide an improved method of determining structure-borne intensities in vibrating plate acoustic radiators or sources.

It is a further object of the present invention to provide a non-contact method of determining structure-borne intensities in point-driven, fluid-loaded, homogeneous thin plates.

It is another object of the present invention to provide a method of measuring structure-borne intenstities in plate-like acoustic sources wherein the acoustic pressure, in a plane very close to the plate, is measured, and the pressure measurement is then used to calculate the two-dimensional structural intensity vector inside the plate.

It is another object of the present invention to provide a non-contact method of measuring structure-borne intensity in an acoustic plate source which requires only a single probe, and does not require an anechoic chamber.

It is another object of the present invention to provide a non-contact method of determining both the power injected into a plate-like acoustic source by a driver, and the acoustic power radiated from source into a radiating medium, and for identifying multiple drivers.

These and other objects are achieved in accordance with the present invention by a non-contact method of measuring structural intensity in a vibrating plate radiator having at least one source of vibration, wherein a pressure hologram of the pressure radiated from a surface of the radiator is produced, the normal velocity of the radiator surface is determined from the pressure hologram, and at both components of the structure-borne intensity is determined from the normal velocity of the radiator surface.

It has been demonstrated that the location of a point driver used to excite a plate into vibration is uniquely identifiable from a map of the structural intensity produced in accordance with the present invention. Furthermore, the power delivered to the plate from a driver is also accurately determined from the line integral of the normal intensity over a closed path enclosing the driver.

The method of the present invention is particularly powerful because the pressure measurements can also be analyzed to determine the normal acoustic intensity on the plate surface. The normal acoustic intensity can then be used to calculate a power per unit area radiated into the medium. Thus, the power injected into the plate by the driver, and the power radiated from the plate into the medium can be determined, and these quantities determine the efficiency of the radiation from the source into the medium. It is also possible to determine now different areas of the plate will deliver different amounts of power to the medium. These and other objects, features and advantages of the present invention are disclosed in or are apparent from the following detailed description of the preferred embodiments.

BRIEF DESCRIPTION OF THE DRAWINGS

The preferred embodiments are described with reference to the drawings, in which like elements are denoted with like reference numbers throughout the figures, and in which.

DETAILED DESCRIPTION OF THE PREFERRED EMBODIMENTS OF THE PRESENT INVENTION

Figure 1:
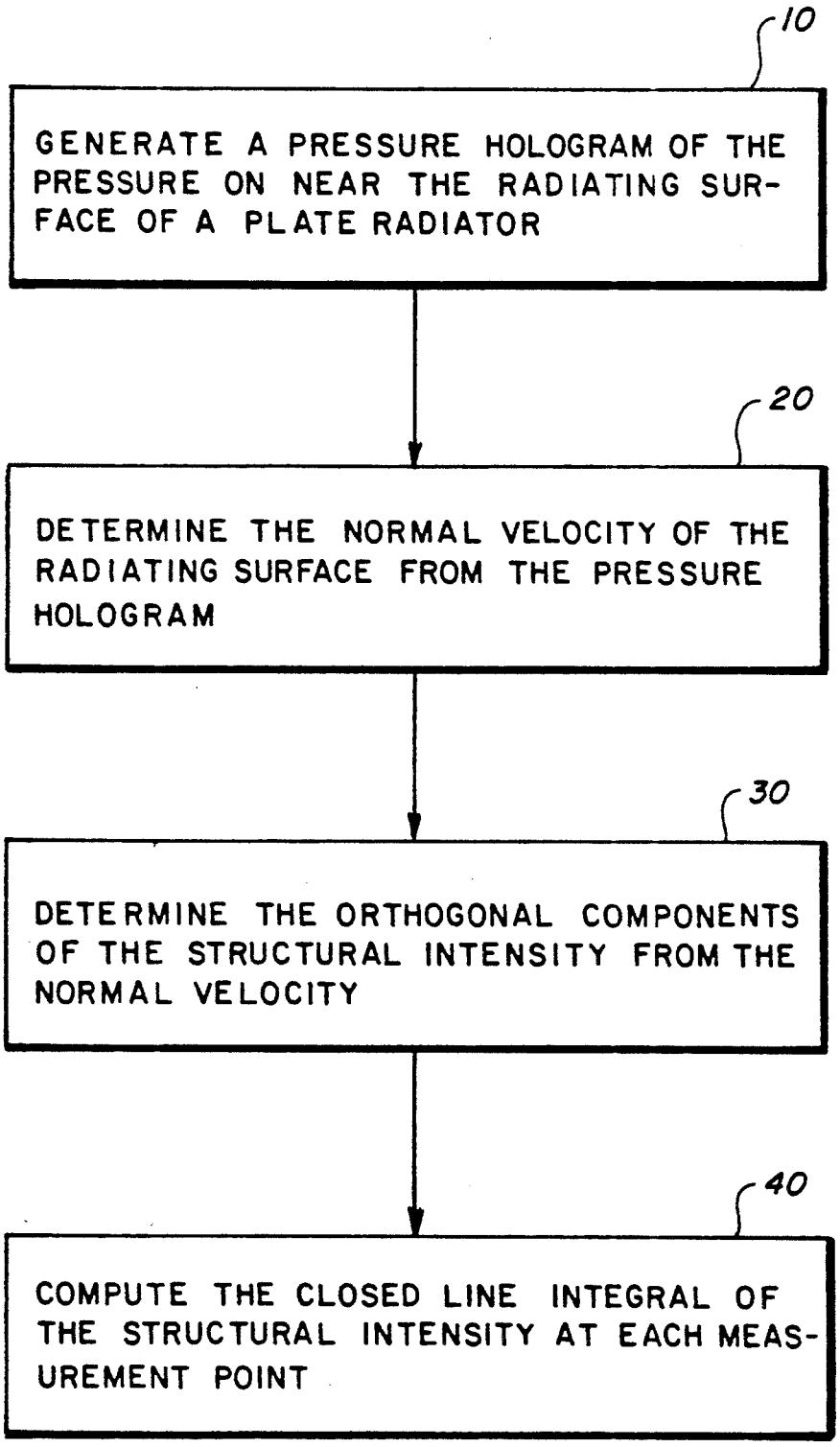
FIG. 1 is a flow chart of the method of the present invention for measuring structural intensity in a plate.

Referring to the flow chart of FIG. 1, structure-borne intensities within a radiating plate (plate radiator or source) are measured by first obtaining amplitude and phase measurements of the radiated pressure in a measurement plane of predetermined size and located at a predetermined distance from the plate in the nearfield of the sound field such that the pressure measurements constitute a pressure "hologram" of the pressure on the radiating surface of the plate (step 10). Next (step 20), the normal velocity is derived from the pressure hologram; and then the orthogonal components of the structure-borne intensity vector are derived from the normal velocity in step 30. The sources of energy on the plate can then be located and characterized by computing the closed line integral of the structure-borne intensity (step 40) at each of a plurality of discrete measurement points.

Figure 2:
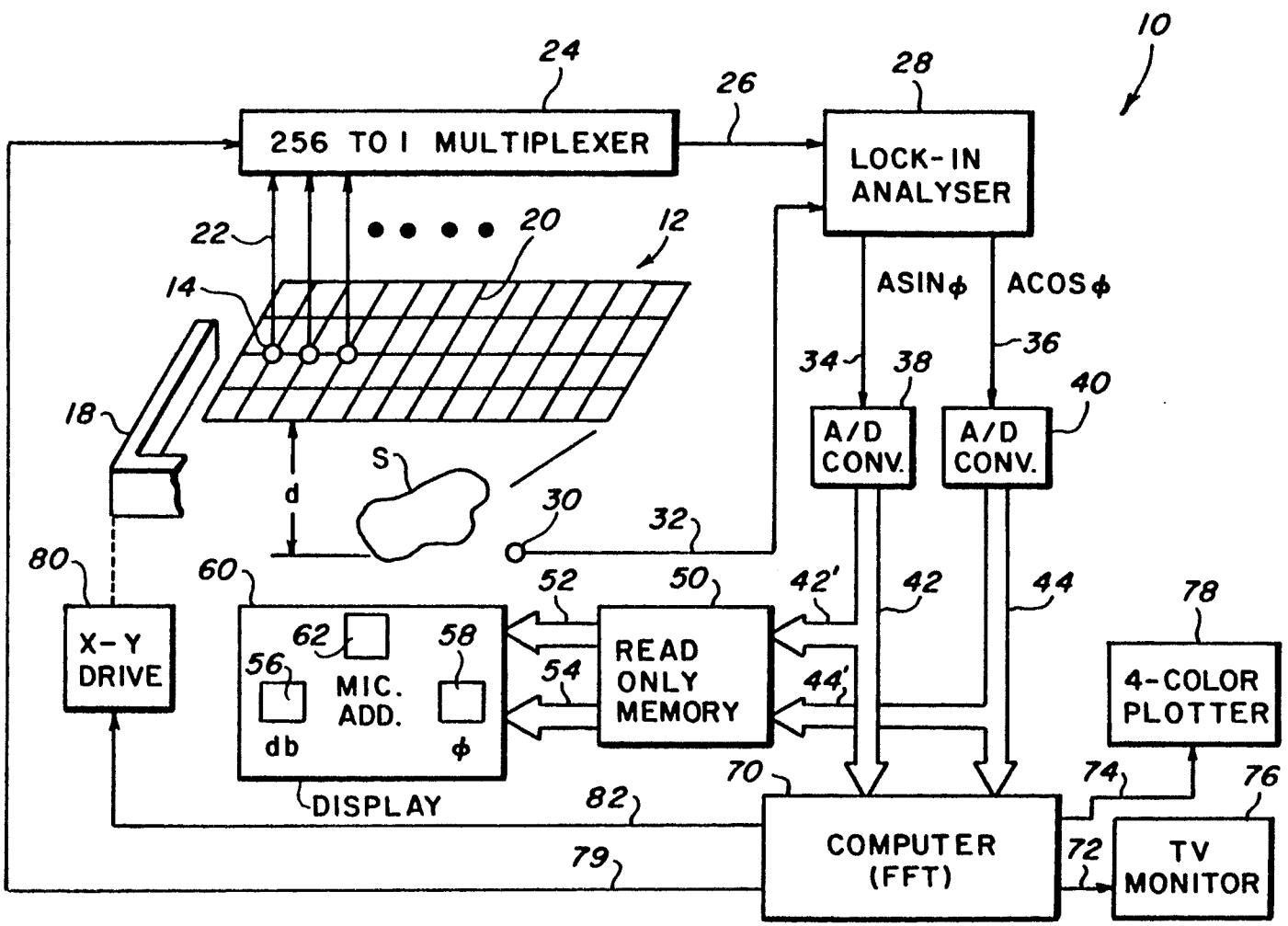
FIG. 2 is a schematic diagram of apparatus for obtaining and processing pressure measurements according to the present invention.

Exemplary apparatus for generating and processing the sound field measurements to produce the pressure hologram is described in the aforementioned Maynard et al. patent, which is hereby incorporated by reference. Referring to FIG. 2, this apparatus comprises a planar array 12 of pressure transducers 14 disposed in the nearfield at a distance d from a planar source S so as to subtend a large solid angle. Microphones, hydrophones (for underwater applications), or any other suitable type of transducer can be used as transducers 14. The measurements do not need to be taken in an anechoic chamber. Transducers 14 are connected by shielded cables 22 to a multiplexer 24 which sequentially samples the transducer outputs and provides a serialized and preamplified output on line 26 to a resolver or lock-in analyzer 28. A second or reference input to analyzer 28 is derived from a reference transducer 30 disposed adjacent source S, and is connected to analyzer 28 by line 32, as shown.

Analyzer 28 comprises conventional phase-sensitive circuitry responsive to the reference signal on line 32 and the transducer signal on line 26 to provide DC output signals proportional to the in-phase and the quadrature components, $A(\sin\phi)$ and $A(\cos\phi)$, respectively, of the pressure amplitude A at each transducer when sampled by multiplexer 24. The outputs of analyzer 28 are provided on lines 34 and 36, which are respectively connected to analog-to-digital (A/D) converters 38 and 40. The digital outputs 42 and 44 of A/D converters 38 and 40 are applied to an addressable storage memory 46. Memory 46 is accessed by a conventional computer 70 programmed to perform the data processing and analysis steps described in more detail hereinbelow on the amplitude and phase data stored in memory 46. Computer 70 is also programmed to generate graphic display signals based on the data analysis for driving display, recording or other utilization apparatus, such as, for example a television monitor 76 and 4-color plotter 78, as shown. Computer 70 is further preferably programmed to control the switching or sampling of multiplexer 24 via line 78, and a two axis drive 80 via line 82 for controlling the position of array 12 relative to source S to expand the number of data points which can be obtained.

In accordance with the present invention, only a single probe is required to obtain the pressure measurements. Thus, transducer array 12 and multiplexer 24 advantageously are replaced by a single conventional scanning microphone/hydrophone or other scanning transducer. Because of the effects of evanescent waves, the measurement plane advantageously is located as close as possible to, but not on the radiating surface of source S, so that the evanescent wave information falls within the dynamic range of the pressure transducers and measurement system. The resolution R, i.e., the distance between two resolvable point sources, of the pressure hologram is given by $$R=20\pi/D(\ln 10d)$$

where D is the dynamic range of transducers 14 and the measurement system.

The measurement plane should be at least equal in surface area to the size of the radiating surface of source S. If the Fourier transform method described hereinafter is used to determine the normal velocity, then the measurement plane preferably is at least four times the area of the radiating surface. In practice, it has typically proven sufficient to take 4096 measurements over a 64×64 measurement lattice.

In the following description, the signal processing and analysis is described only with respect to sine wave excitation, but it will be appreciated that it is not limited to this regime. As described above, in order to calculate the structural intensity, it is first necessary to determine the normal velocity at the plate surface. In accordance with the invention, the normal velocity is derived from the nearfield pressure measurements based on Green's theorem as follows. If the plate source S is located parallel to an x-y reference plane at z=d, and the pressure measurement plane is located at z=h (h>d), then the normal velocity $v_z$ of the plate at any position on the plate is:

$$v_z(x,y,d)=(1/\omega p)F^{-1}\{k_z e^{ik_z(h-d)}xF[p(x,y,h)]W(k_x, k_y)\} \quad (1)$$

where

F and $F^{-1}$=the two-dimensional forward and inverse Fourier transforms in x and y, and $k_x$ and $k_y$, respectively;

p=the measured pressure;

$$k_z=\sqrt{(\omega/c)^2-k_x^2-k_y^2}\text{, for } k_x^2+k_y^2\leqq(\omega/c)^2; \quad (2)$$

$$k_z=i\sqrt{k_x^2+k_y^2-(\omega/c)^2}\text{, for } k_x^2+k_y^2>(\omega/c)^2; \quad (3)$$

ω=the excitation frequency of the plate; and c=the sound speed in the medium.

The time dependence $e^{-i\omega t}$ of the equation is suppressed. $W(k_x, k_y)$ is a window function in k space (transform space) which is essentially:

$$W(k_x, k_y)\approx 1 \text{ for } (k_x^2+k_y^2)<k_c^2,$$

$$W(k_x, k_y)\approx 0 \text{ for } (k_x^2+k_y^2)>k_c^2 \text{ and}$$

$$W(k_x, k_y)=\tfrac{1}{2} \text{ for } (k_x^2+k_y^2)=k_c^2.$$

The window function $W(k_x, k_y)$ is chosen so that it makes a smooth transition through the value ½ at $k_c$, the break point of the window.

Equation (1) can be better understood as follows. The expression F[p(x,y,h)], the Fourier transform of the pressure field, represents an infinite sum of plane wave components with directions $(k_x,k_y,k_z)$. Multiplication by the window function removes the noisy "plane" wave components above $k_c$ from the spectrum. Actually, these components are not plane waves but are evanescent waves (imaginary value of $k_z$) which die out exponentially in the z direction. The exponential term in equation (1) back propagates the plane and evanescent wave components to another plane (z=d). Multiplication by the factor $k_z/\omega p$ converts the pressure components to normal velocity components. Finally., the inverse Fourier transform recomposes the k-space spectrum of the velocity field into its equivalent spatial variations at z=d, providing the normal velocity at the surface of the plate.

The need for the window function $W(k_x, k_y)$ becomes clear once it is recognized that, as $k_z$ becomes a large imaginary number, the exponential term in equation (1) becomes extremely large and amplifies unwanted noise which is inherent in the wave spectrum of the measured pressure. The window merely chops out these noisy components. Choosing $k_c$ is critical to the analysis. It is essential that most of the k-space spectra of the actual vibration fall within the circle of radius $k_c$, in order to obtain an accurate reconstruction of the vibration field. It is reasonable to assume that most of the spectrum of a given plate source will tend to concentrate around the value for an infinite plate of the same material and thickness as the actual plate. This value is given by $$k_p=\omega^{\frac{1}{2}}/(D/m)^{\frac{1}{4}} \quad (5)$$

where D is the flexural rigidity and M is a mass per unit area. Thus, as long as the environment allows $k_p$ to be kept less than $k_c$, equation (1) produces a very accurate representation of normal velocity $v_z$.

Figure 3:
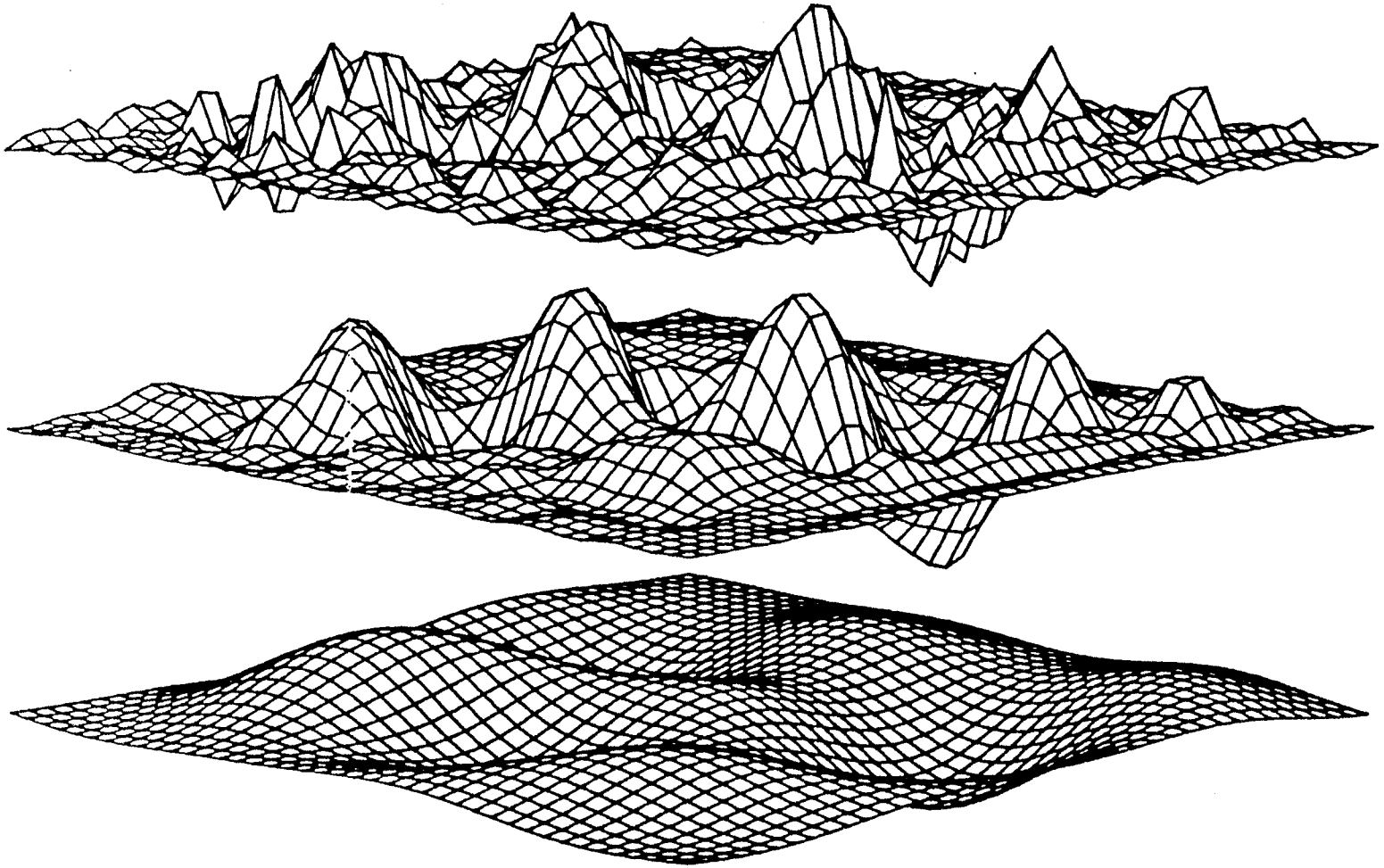
FIG. 3 shows three plots of a reconstructed normal velocity (at a given instant of time) on the surface of a point driven square plate using different values of a window cut-off frequency $k_c$.

FIG. 3 shows the effects that different values of $k_c$ have upon the reconstructed normal velocity on the surface of a vibrating plate. Experimental pressure data for a square plate were used, and the displayed velocity was determined from equation (1) using two extreme values of $k_c$. In the top plot, the value of $k_c$ (236 rad/m) was too large and the high spatial frequency (noise carrying) evanescent waves were not filtered out, resulting in a very jagged look for the reconstructed velocity. The edge of the square plate is two lattice points in from the edge of the displayed aperture. In the bottom plot of FIG. 3, the value of $k_c$ (39.3 rad/m) was too small, such that $k_c$ was less than $k_p$. That is, the physically important plate wave lengths (of frequency $k_p$) are in the stopband of the window. This results in a reconstructed velocity which tends to "spill over" into the outside of the plate when compared with the correct velocity as shown in the center plot of FIG. 3. It is also clear that interior variations are smoothed and their maxima are shifted when the values of $k_c$ are too small. If the distance from the plate to the measurement plane (h-D) is kept as small as possible, then the exponential "blow-up" in equation (1) will be kept to a minimum. Further, the Fourier transform necessitates that the pressure be measured for all values of x and y, i.e., over an infinite plane. Fortunately, the pressure field decays rapidly as the plate edge is crossed (the pressure plane is very close to the plate), and thus the assumption of zero pressure over most of the infinite plane is quite accurate. As noted above, in practice a measurement plane having a surface area four times as large as the surface area of source S has provided satisfactory results.

Pavic's derivation is used to express the two orthogonal components of the structural intensity (power flow per unit area) in a thin plate. In the derivation, shear and rotary inertia are neglected so that thick plates are not considered. If w is the plate displacement in the z direction, then the time averaged intensity in the x direction and y direction are given, respectively, by:

$$I_x = \langle D\left[\frac{\partial}{\partial x}(\nabla^2 w)v_z - \left(\frac{\partial^2 w}{\partial x^2} + \nu\frac{\partial^2 w}{\partial y^2}\right)\frac{\partial v_z}{\partial x} - (1-\nu)\frac{\partial^2 w}{\partial x \partial y}\ \frac{\partial v_z}{\partial y}\right]\rangle_t, \quad (5)$$

and $$I_y = \langle D\left[\frac{\partial}{\partial y}(\nabla^2 w)v_z - \left(\frac{\partial^2 w}{\partial y^2} + \nu\frac{\partial^2 w}{\partial x^2}\right)\frac{\partial v_z}{\partial y} - (1-\nu)\frac{\partial^2 w}{\partial x \partial y}\ \frac{\partial v_z}{\partial x}\right]\rangle_t, \quad (6)$$

In these two equations, the $\langle\rangle_t$ term represents a time averaged quantity, and $\nu$ is Poisson's compression. For the sake of clarity, the present description is restricted to a single frequency excitation, so that time dependence $e^{-i\omega t}$ is implicit. (It will be appreciated, though, that the present invention can be used with multiple frequency excitation, such as, for example, sine sweeping or noise excitation.). Thus, $w = -v_z/i\omega$. Equations (5) and (6) show that a knowledge of the normal velocity $v_z$ is sufficient to determine $I_x$ and $I_y$ as long the spatial derivatives of $v_z$ are also known.

The most straightforward technique to determine these spatial derivatives is to use conventional finite difference, partial derivative formulas of numerical analysis, as described, for example, in the *Handbook of Mathematical Functions,* edited by Abramowitz et al., (National Bureau of Standards, Washington, D.C., 1964 , page 884. These formulas are easily applied since values of $v_z(x,y,d)$ in equation (1) are provided at each of the measurement locations, and with sufficient density over the plate.

A second technique, although computationally more time consuming, provides slightly more accurate results and is more consistent with the processing used in equation (1) since it uses Fourier transforms. This technique uses the fact that the spatial derivatives in equations (5) and (6) are easily obtained using Fourier transforms from the following relationship:

$$\frac{\partial^m}{\partial x^m}\ \frac{\partial^n}{\partial y^n}[v_z(x,y,d)] = F^{-1}\{(ik_x)^m (ik_y)^n F[v_z(x,y,d)]\} \quad (7)$$

As before, $v_z = i\omega w$, and $F^{-1}$ is the inverse Fourier transform in $k_x$ and $k_y$. Equation (7) shows that each derivative in the equations (5) and (6) is derived from a separate inverse Fourier transform requiring much longer computation time than a point by point, finite difference approximation. However, equation (7) uses all the points on the plane to determine the derivatives at each point. Thus, it is less susceptible to errors in individual points. It will be noted that $F(v_z)$ is obtained from equation (1). The fast Fourier transform algorithm (FFT) advantageously is used for the numerical computation.

Figure 4:
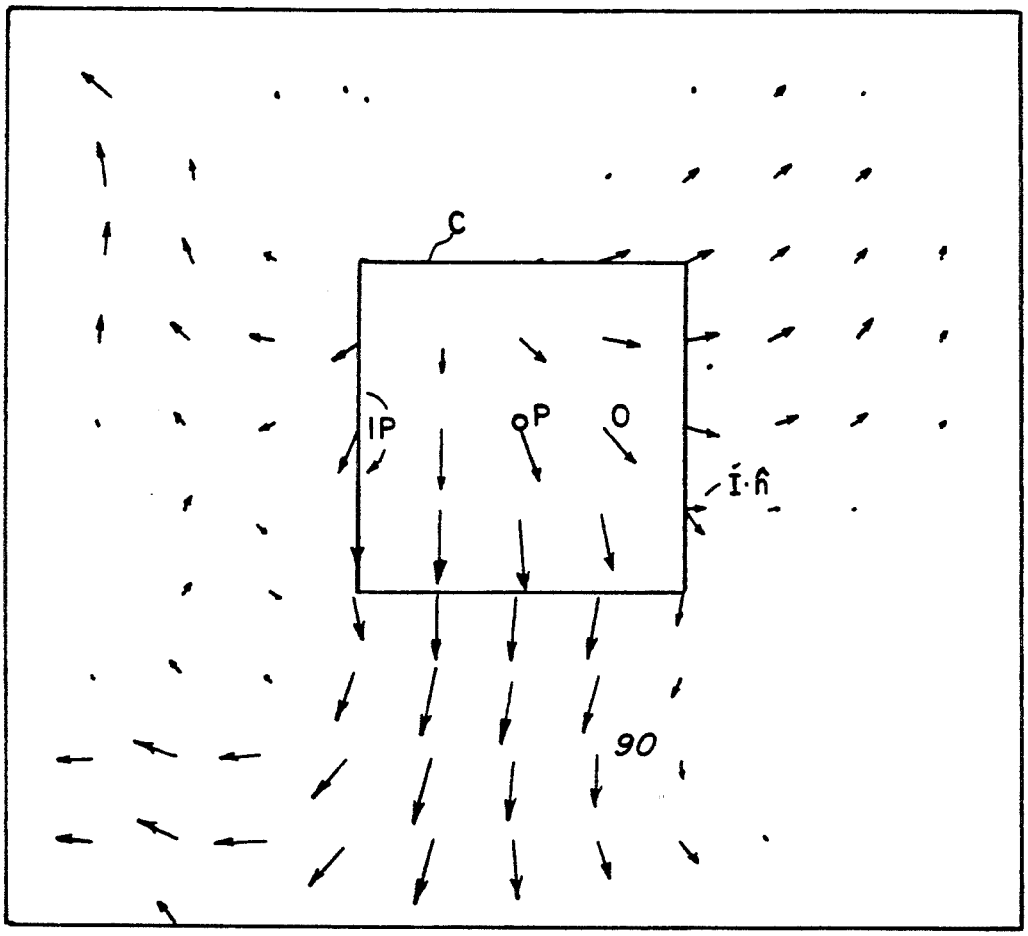
FIG. 4 shows a segment of a structural intensity map in a plate source to illustrate the computation of injected power.
Figure 5:
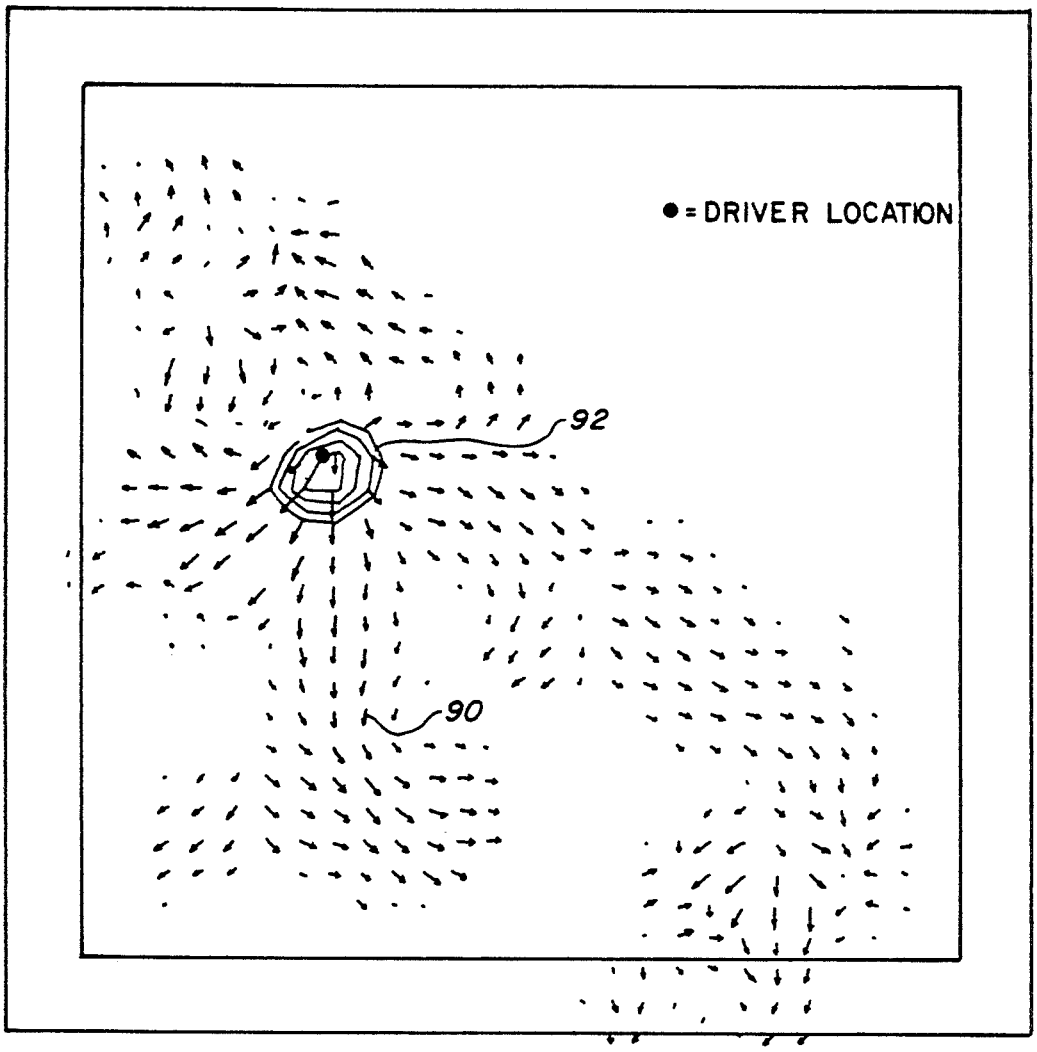
FIG. 5 shows an exemplary structural intensity map of a plate radiator.

By calculating the structure-borne intensity at each of the measurement points, a structural intensity map can be plotted. The power injected into the plate, $\Pi_c$, is determined as follows. As is well known, the amount of power injected into a volume enclosed by a surface S is given by $$\Pi = \int_s \vec{I}\cdot\hat{n}dA \quad (8)$$

where n is the outward normal to the element of area dA, and $\vec{I}$ is the power passing through a unit area. If there is no vibration source in this volume, then the power $\Pi$ zero. To apply this formula to a plate, S is defined as the surface of a rectangular parallelpiped. It is assumed that the injected power which enters the top and bottom of the parallelpiped is negligible compared to the structural power entering through the sides. Since the thickness of the plate is constant and it can be assumed that the structural intensity does not vary across this thickness, then equation (8) becomes $$\Pi_c = \int_c \vec{I}\cdot\hat{n}d1 \quad (9)$$

where d1 is a unit length of a square contour C, the perimeter of a box; and $\vec{I}$ is the power passing through d1. If the contour C encloses the location of a point driver attached to a plate source, then $\Pi_c$ provides the power injected into the plate from the driver (minus the small amount of power which radiates from the front and back surfaces of the plate). FIG. 4 illustrates the technique for computing $\Pi_c$ when dealing with discrete data points on the plate. Note that the tail of each structural intensity vector 90 corresponds with a lattice point, the perpendicular projection of a pressure measurement off the plate surface, and represents the point to which the vector is assigned. Countour C is preferably comprised of at least a 5×5 grid so that a minimum of 16 vectors contribute to the integral in equation 9. (Smaller grids have proven less accurate in practice.) In FIG. 4, the corner intensity vectors are split into their horizontal components for the vertical segment of length d1/2, and into their vertical component for the adjacent horizontal segment of length d1/2. The value of the integral is assigned to a point P at the center of the box. The box is then translated to the right one lattice point, and a new injected power is computed and assigned to point Q. The contour box is translated in this way over the whole surface, so that each point (except for edge and adjacent interior points) is assigned an injected power. Contour plots can then be developed from this injected power data. An example of an intensity vector map including structural intensity vectors 90 and injected power contours 92 is shown in FIG. 5.

It is also possible to derive the normal acoustic intensity $I_{za}$ on the plate surface from the normal velocity as determined using equation (1) above. $I_{za}$ is derived as follows:

$$I_{za}(x,y,0) = \tfrac{1}{2}\mathrm{RE}\,[p(x,y,0)v_z{}^*(x,y,0)], \quad (10)$$

where the plate surface is located at $z=0$, and $p(x,y,0)$ is the acoustic pressure on the plate surface. The term $v_z^*(x,y,0)$ is determined from the complex conjugate of equation (1) with $d=0$. As with equation (1), $p(x,y,0)$ can be expressed in terms of $p(x,y,h)$, where $z=h$:

$$p(x,y,0)=F^{-1}\{e^{-ik_zh}F[p(x,y,h)]\ W(k_x,k_y)\}, \quad (11)$$

Again, the window $W(k_x,k_y)$ is used to remove the noisy evanescent waves inherent in the pressure spectrum $F[p(x,y,h)]$ exactly as is done for equation (1). The results from equations (1) and (11) are introduced into equation (10) to compute the normal acoustic intensity over the plate surface. One of the important advantages of the present invention is the fact that both the acoustic intensity and the structural intensity are determined from the same measurement.

The present invention has been successfully tested experimentally using a source S comprising a plurality of F9 Wilcoxon drivers as vibration generators mounted to an aluminum plate 0.35 meter square and 0.64 centimeters thick. Steel bars 52.5 centimeters wide and 3.5 centimeters deep were bolted to the plate along the rim thereof. The quantity D/m, the ratio of flexural rigidity to mass per unit area, was computed to be 97.2 $m^4/s^2$ for the plate. The density was 2700 $kg/m^3$ and Poisson's contraction was 0.334. A plexiglass back enclosure provided a water tight seal around the drivers and was attached with a 1/16 neoprene gasket to the plate. The source was hung vertically in a large underwater tank at a depth of 1.5 meter. An automated scanner was used to position a hydrophone at the intersections of a $64\times64$ measurement lattice in a measurement plane 1.3 centimeters from the plate surface. The lattice spacing was 1.1 centimeters, which provided 1089 measurement points over the plate. Thus, the plate area encompassed ¼ of the measurement aperture (70 cm on a side). The plate was driven at 3 kilohertz. At each of the lattice points, the amplitude and phase of the pressure was digitally recorded. A window function cutoff of $k_c=118$ radians/m was used. The test results which were obtained are described in detail in Williams et al., "A technique for measurement of structure-borne intensity in plates," *J. Acoust. Soc. Am.*, Vol. 78 (No. 6), December 1985, pp. 2061-2068, which is hereby incorporated herein by reference.

One of the most important features of determining the structural intensity in accordance with the present invention is the ability to locate and characterize the sources of energies on a plate radiator. The power delivered by each is accurately measured from the closed line integral of this intensity. Comparisons between the normal acoustic intensity on the plate surface and the structural intensity within the plate have confirmed that the acoustic intensity cannot be used to locate vibration generators on a plate. Although the acoustic intensity peaks at a driver's location, it also peaks at other locations on the plate surface which appear as pseudo sources. In contrast, the structural intensity vector does not generate the pseudo sources. It accurately identifies the real sources of the plate structure.

The structural intensity vector maps also indicate the paths of power flow in the structure, that is, where the losses are located. The inventors have observed that a small portion of the energy is converted to acoustic radiation and that most of the energy is absorbed to the supporting boundary of the plate. In one case, with several sources, one of the sources was even seen to absorb energy.

The present invention allows all quantities of interest to be measured, including pressure, vector velocity, vector acoustic and structural intensities, injected power, radiated power, energy density (structural and within the radiating fluid). Furthermore, these quantities are computed not only in the measurement plane, but also in any plane from the surface of the source to infinity.

What is claimed is:

1. A non-contact method of measuring structure-borne intensities in a vibrating plate radiator having at least one source of vibration, said method comprising the steps of:

producing a pressure hologram of the pressure radiated from a surface of the radiator;

determining the velocity of said radiator normal to said surface from said pressure hologram; and determining at least one vector component of the structure-borne intensity from said velocity of said radiator normal to said surface.

2. The method of claim 1, wherein said at least one vector component of the structure-borne intensity are three spatially orthogonal components of said structure-borne intensity.

* * * * *